June 29, 1937.　　　　L. S. MAEDE　　　　2,085,376
ART OF MANUFACTURING COFFEE
Filed Aug. 28, 1933　　　4 Sheets-Sheet 3
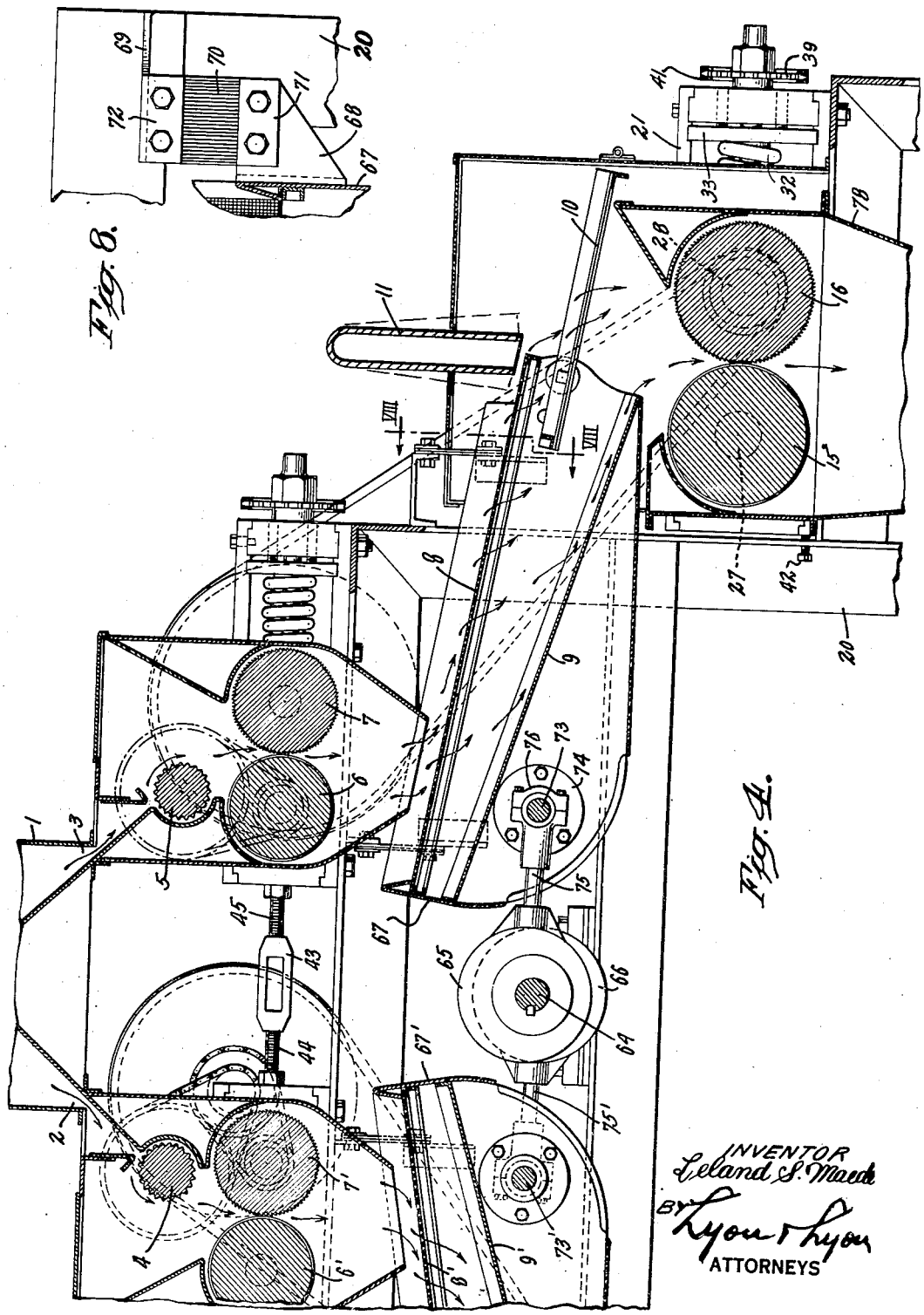

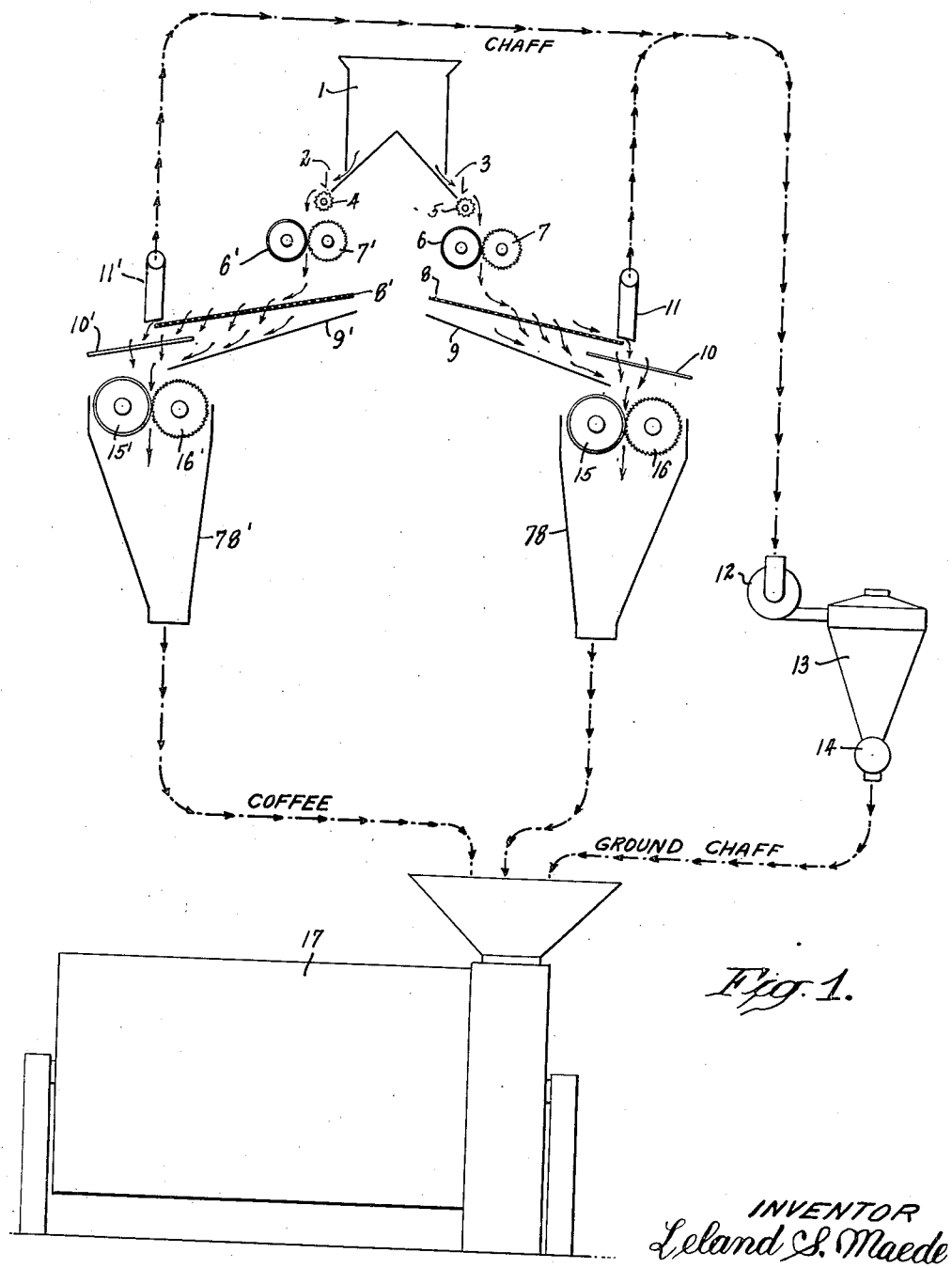

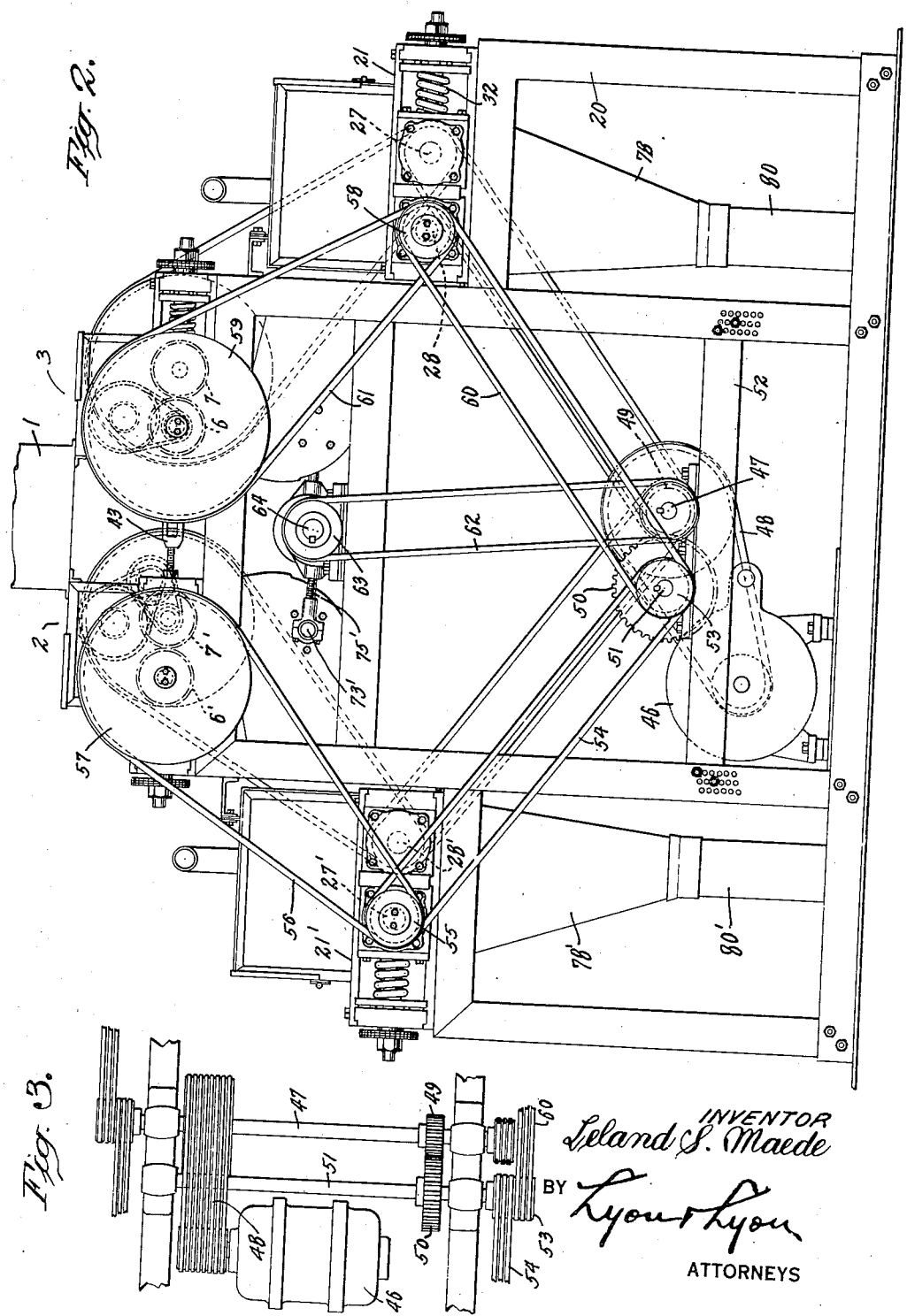

June 29, 1937. L. S. MAEDE 2,085,376
ART OF MANUFACTURING COFFEE
Filed Aug. 28, 1933 4 Sheets-Sheet 4
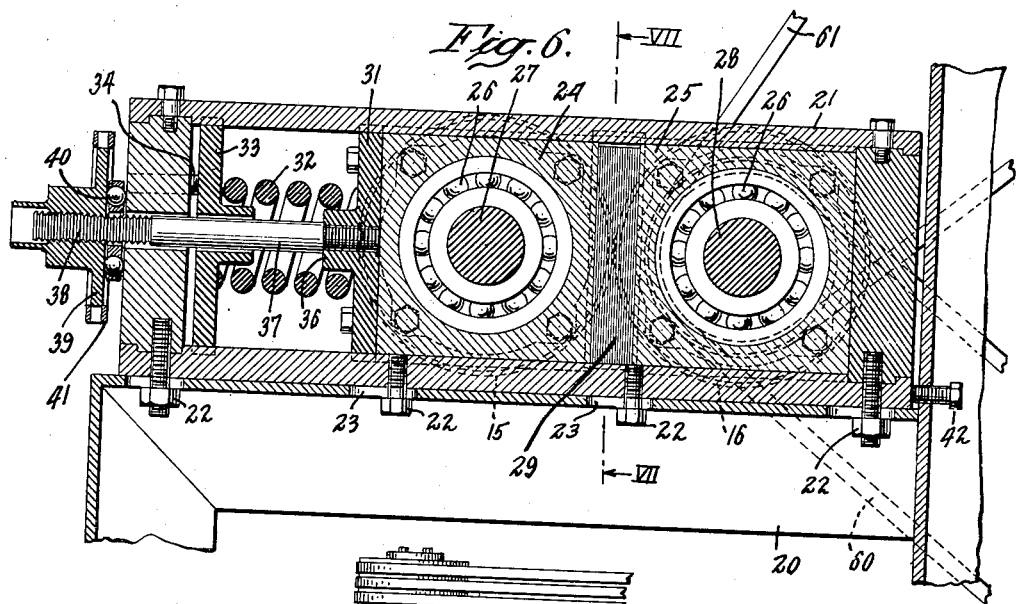
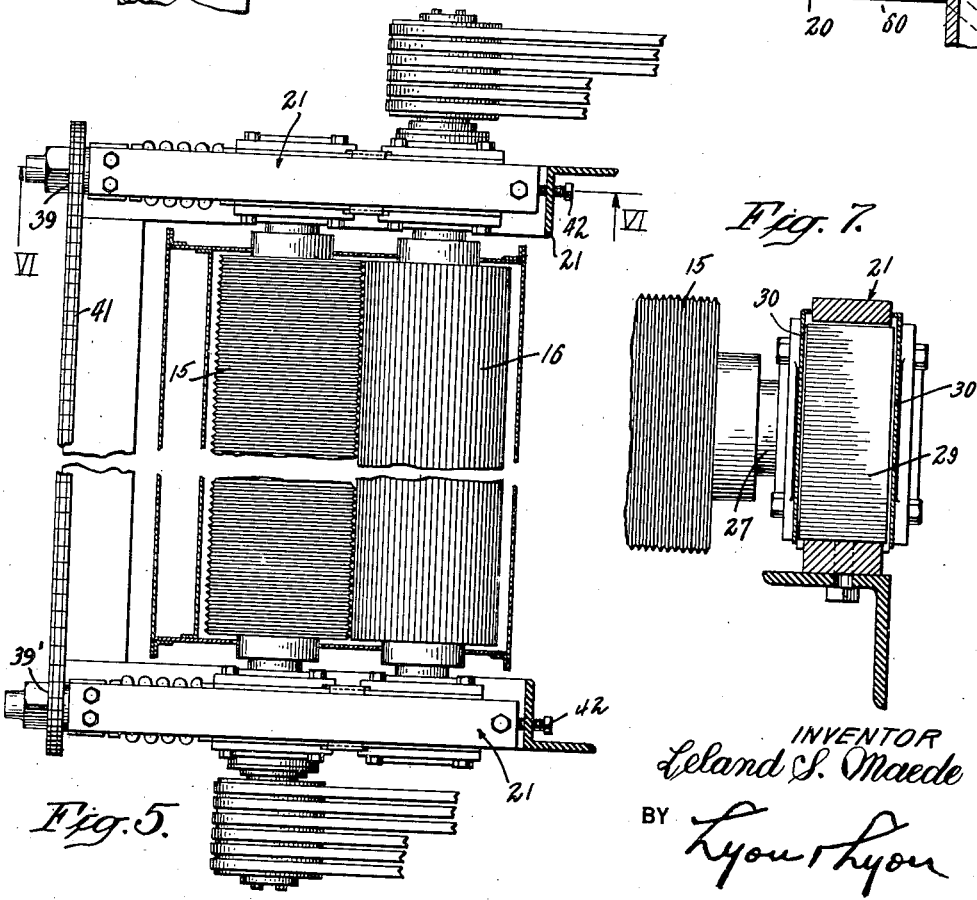
INVENTOR
Leland S. Maede
BY Lyon & Lyon
ATTORNEYS Patented June 29, 1937

2,085,376

UNITED STATES PATENT OFFICE 2,085,376

ART OF MANUFACTURING COFFEE

Leland S. Maede, Brooklyn, N. Y.

Application August 28, 1933, Serial No. 687,078

3 Claims. (Cl. 99—65)

This invention relates to a coffee having a better flavor and a more readily extractable flavor than coffee now available on the open market. Furthermore, the product of this invention contains chaff in substantially the same proportions as occur in the coffee bean and thereby the coffee manufacturer obtains a larger yield of a given weight of coffee beans. The coffee, however, does not stratify in shipment or upon subjection to long continued vibration in the containers so that the purchaser is assured of a homogeneous desired blend.

Furthermore, the coffee of this invention is preferably composed of particles having a desired size and distribution which appears to impart to the coffee enhanced flavor extraction characteristics, adapting it for boiling, percolation or drip purposes. Furthermore the product of this invention is the result of a single grinding operation and the mixing or blending is carried out in such manner that the particles of the product are relatively sharp and clean and do not contain as large quantities of dust nor the rounded worn particles of ordinary coffee.

The present invention also relates to a method of grinding and treating coffee whereby the product above identified is obtained. Ordinarily, coffee is subjected to a plurality of grinding operations in the presence of chaff and is subjected to considerable aeration. Whenever coffee is aerated during its manufacture, it loses some of its volatile flavoring ingredients or constituents. The present method contemplates but a single grinding and very little aeration. Furthermore, the beans are ground in the absence of chaff, the finely cracked coffee being removed from the coarsely cracked coffee before the chaff is separated therefrom. After the chaff is separated, the cracked coffee is ground separately while the chaff is also separately ground. The chaff and ground coffee are then mixed in such quantity and under such conditions of agitation that there is practically no additional formation of fines. Such method of operation insures the production of a coffee having the preferred particle size distribution.

For the purpose of placing the method into operation, it has been found that a particular arrangement of elements gives the preferred results.

One of the objects of this invention is to disclose a finely divided coffee adapted for percolation, boiling or drip, such coffee being characterized by its relative freedom from stratification and enhanced flavor extraction properties.

Another object is to disclose and provide a method of rapidly and economically grinding and normalizing coffee, the method being characterized by the fact that the coffee is subjected to but a single grinding operation in the substantial absence of chaff.

These and other objects, uses and advantages of the invention will become apparent to those skilled in the art from the following detailed description. In order to facilitate understanding of the invention, reference will be had to the appended drawings, in which Fig. 1 diagrammatically illustrates the arrangement of elements in the coffee grinding unit and the movement of the coffee beans, chaff, etc., during the performance of the method.

Fig. 2 is a side elevation of the grinding apparatus.

Fig. 3 is a plan view of the motor drive which forms a part of the grinding apparatus.

Fig. 4 is an enlarged vertical longitudinal section through a portion of the grinding apparatus illustrated in Fig. 2.

Fig. 5 is a horizontal section through one of the grinding units.

Fig. 6 is a vertical longitudinal section taken along the plane VI—VI of Fig. 5, showing the guiding frame and bearing block assembly.

Fig. 7 is a vertical transverse section taken along the plane VII—VII of Fig. 6.

Fig. 8 is a vertical section taken along the plane VIII—VIII of Fig. 4, showing the method of suspending the shaker assembly from the body frame of the grinding apparatus.

As shown in Fig. 1, the roasted coffee beans are fed into a hopper 1 from which they are continuously discharged through the outlets 2 and 3 by means of suitable feeders such as the feeding rolls 4 and 5. The feeding means insure the supply and distribution of coffee to the cracking rolls in a uniform and constant manner. The cracking rolls comprise a high speed circumferentially ribbed roll 6 and a low speed longitudinally ribbed roll 7. The cracked coffee then passes onto a shaker screen 8 which is inclined and the cracked coffee is contacted with the upper portion of the screen. The finely divided cracked coffee passes through the screen 8 onto a chute 9. The larger particles of coffee, together with the chaff, move along the screen 8, the larger particles eventually falling onto a grille work termed a "string catcher" 10. At the point where the chaff and large particles would fall off the end of the shaker screen 8, suction is applied moves or separates the chaff from the larger particles. The separation of chaff and coffee is substantially complete at this point because it is being made in the absence of finely divided coffee. It is to be noted that any finely divided coffee produced by the cracking rolls 6 and 7 would have passed through the screen 8 before reaching the point at which the suction is applied.

The chaff is conveyed, as indicated by the arrows, through a suction fan 12 and into a chaff collector 13 from whence it is discharged into a chaff grinder 14. Chaff grinders are known in the art and generally operate by rapidly throwing and brushing the chaff against a foraminous surface or screen.

The grille or string catcher 10 retains large impurities such as strings, etc., and directs them away from the grinding rolls. Coffee free from chaff and from coarse impurities is thus directed into the grinding rolls which comprise a slow-speed circumferentially ribbed roll 15 and a higher oppositely driven, longitudinally ribbed roll 16. The finishing or grinding rolls 15 and 16 comminute the coffee to the required state of division. The ground coffee then passes into the hopper of a mixer or normalizer 17 wherein it is intimately but gently mixed with ground chaff from the chaff grinder 14. The mixer 17 is provided with spiral flight agitators driven by means not shown. It is similar in construction to mixing machines used in this art but is preferably of much larger capacity and is driven at a much lower speed so as not to subject the coffee to a violent rubbing or attrition. The coffee thus treated is then sent to the packing machines.

In the above description, the coffee has been traced through one-half of the complete grinding unit. The other half is similarly constructed and like elements or parts have been marked with like numerals.

The grinding operation described hereinabove is carried out in such manner as to produce a coffee having the following screen analysis:

|  | Per cent |
|---|---|
| Remaining on a No. 5 sieve | 0.5–1.2 |
| Remaining on a No. 4½ sieve | 6.5–8.0 |
| Remaining on a No. 4 sieve | 27–29 |
| Remaining on a No. 28 sieve | 50–54 |
| Passing through a B screen as dust | 10–13 |

Although the above screen analysis is representative of the preferred particle size classification, the following is a more detailed and more specific range of preferred sizes:

|  | Per cent |
|---|---|
| Remaining on a No. 5 sieve | 0.65–1.0 |
| Remaining on a No. 4½ sieve | 7.0–7.25 |
| Remaining on a No. 4 sieve | 27.5–28.5 |
| Remaining on a No. 28 sieve | 52.5–53.0 |
| Passing through a B screen as dust | 10.5–12.0 |

Attention is called in this connection to the fact that the preferred coffee preferably contains no appreciable quantity of material on a No. 5½ sieve and only a very small quantity, less than 1.2%, remains on a No. 5. The major proportion of the coffee, that is, over 70% thereof, will pass a No. 4½ but will be retained on a No. 28. This is particularly notable in view of the fact that all of the chaff is present in the coffee. It has been found that a coffee having the above defined particle size classification when made in accordance with the method described hereinabove will not stratify upon shipment and has materially enhanced flavor extraction properties.

The grinding apparatus diagrammatically illustrated in Fig. 1 is shown in more detail in the other drawings. The general arrangement of hopper, cracking rolls and grinding rolls is identical to that shown in Fig. 1. The grinding apparatus is preferably built in duplicate so as to contain two sets of cracking and grinding rolls, although coffee is passed through the grinding rolls but once.

As shown in Figs. 2 and 3, the grinding apparatus includes a body frame 20 on which are mounted the duplicate cracking and grinding rolls. One of the distinguishing characteristics of this apparatus is the mounting of the rolls so that they are easily adjustable and at the same time held with sufficient rigidity so as to prevent separation of opposing rolls. Both cracking and grinding rolls may be mounted in bearing blocks adjustably positioned within guiding frames 21 which in turn are also adjustably positioned on the body frame 20. Detailed construction of the guiding frames and appurtenances is shown in Figs. 6 and 7.

As there shown, the guiding frame 21 is preferably of rectangular form, including top, bottom and end plates fastened together in a suitable manner as by means of machine screws. This guiding frame 21 is adjustably connected to the body frame 20 as by means of bolts 22, said bolts extending through slots 23 formed in the horizontal portion of the main frame 20. Movably positioned within the guiding frame 21 are bearing blocks 24 and 25, said bearing blocks containing suitable bearings 26 within which the shafts 27 and 28 are journaled. The shafts 27 and 28 may carry the grinding rolls 15 and 16.

Positioned between the bearing blocks 24 and 25 is a set of shims 29. The edges of the shims 29 are protected from dust by means of cover plates 30.

The end of the outer bearing block 24 rests against an end plate 31 which has a compression spring 32 bearing thereagainst. The compression spring is positioned between the end plate 31 and a presser plate 33. The presser plate is movably positioned within the guiding frame 21, the adjustment being obtained by means of screws 34 mounted in internally threaded apertures in the end of the guiding frame 21. Preferably, the compression spring 32 is sufficiently heavy to prevent any appreciable movement of the bearing blocks 24 and 25 relative to each other, the main function of the compression spring being to dampen vibration.

The spacing between the rolls 15 and 16 carried by the shafts 27 and 28 journaled in bearing blocks 24 and 25 is regulated by the shims 29. The distance between the rolls can therefore be regulated with great nicety by the introduction or the removal of the shims. These shims may have an individual thickness of 0.001 inch. In order to facilitate the removal of shims whenever it is necessary to adjust the rolls relative to each other, the end plate 31 is provided with a boss 36 in which the end of a rod 37 is firmly attached. The rod 37 extends beyond the guiding frame 21, the outer end of said rod being externally threaded as indicated at 38. Threadedly mounted on the end of this rod is a sprocket wheel 39, a thrust bearing 40 being positioned between the sprocket wheel and the end wall of the guiding frame 21. A chain 41 may connect the sprockets 39 and 39' mounted on rods in opposing guiding frames by a set of rolls so that both end plates in both guiding frames may be simultaneously moved.

In order to facilitate the movement of the guiding frames 21 along the body frame 20, stop screws 42 may be threaded through a portion of the frame 20, the ends of the stop screws abutting the end of the guiding frame 21.

As shown in Figs. 2, 3, 4, and 5, the rolls of every unit are driven from opposite ends. For example, the roll 15 is driven from the bottom end (on the drawings) whereas the roll 16 is driven from the upper end. Such method of driving rolls permits the use of V type belting, the high speed rolls being driven from one side of the machine whereas the low speed rolls are driven from the other side. Furthermore, the use of V belts or roped drive eliminates vibration and facilitates adjustment. Where gears and pinion are used, it is often necessary to cut down the gears every time the rolls are cut down for a major adjustment.

On the present machine, however, the tension in the belt drive may be readily adjusted by moving the guiding frames 21 along the body frame 20 in the manner indicated, thereby taking up any slack which may develop in the belt drive. In adjusting the cracking rolls the two guiding frames 21 may be pulled together by means of a turnbuckle 43 which engages with the ends of externally threaded rods 44 and 45 carried by the opposing ends of the guiding frames.

The motor drive consists of a motor 46 mounted in the lower portion of the body frame 20. The motor pulley is connected to a high speed shaft 47 by means of the belt drive 48. The shaft 47 may also carry a herringbone gear 49 in mesh with another gear 50 which drives the low speed shaft 51. The shafts 47 and 51 are journaled in hangers carried by a member 52 which is adjustably connected to the body frame 20. The tension of the main drive belt 48 may therefore be adjusted by moving the member 52 upwardly.

As a rule, the cracking rolls rotate at a lower peripheral speed than the grinding rolls. For this reason the shaft 51 may carry a pulley 53 which is connected by feed belting 54 to the low speed roll connected to the shaft on which pulley 55 is mounted. The same pulley may carry additional belting 56 passing over a pulley 57 mounted on a shaft which carries the low speed roll of the cracking unit. Similar belting connects the pulley 53 with pulleys 58 and 59, as for example the belting 60 and 61. Obviously, therefore, the belts 54, 56, 60 and 61 may be tightened by moving the guiding frames of the grinding rolls outwardly. If it is desired to only tighten belts 56 and 61, then the upper guiding frames of the cracking rolls may be brought closer together by means of the turnbuckle 43.

A similar arrangement of belting but on the opposite side of the machine connects the high speed rolls of the grinding and cracking units with the high speed shaft 47. In addition, a belt or belts 62 connects the high speed shaft 47 with the pulley 63 which is mounted on a shaft 64 provided with eccentrics 65 and 66, these eccentrics being adapted to impart an easily oscillatory motion to the shaker screen units as will be described hereinafter.

After the coffee has been fed from the hopper 1 through the outlet 3 by the feeding roll 5 and has passed through the cracking rolls 6 and 7, it is discharged onto the shaker screen 8. The shaker screen 8 is inclined and is held within a shaker assembly or housing 67. This shaker housing is suspended from the main or body frame 20 by elastic hangers. As shown in Fig. 8, the side member of the shaker housing 67 may be provided with a bracket 68 whereas the main body frame 20 is provided with a horizontally extending bracket 69. The brackets 69 and 68 are connected by means of a rubber hanger 70 which may consist of strips of rubber clamped at their ends to brackets 68 and 69 as by means of clamping plates 71 and 72 respectively. Such hangers are employed at both the upper and lower ends of the shaker housing 67 and on either side thereof.

The lower and rear portion of the shaker housing 67 is provided with a shaft 73 extending in a horizontal direction and connected to the side members of the shaker housing by means of trunnions 74. The eccentric 65 may be connected by a shaker arm 75 with such shaft 73, the end of the shaker arm being provided with a split bearing housing 76. It is evident, therefore, that when the shaft 64 is rotated, the eccentrics 65 will transmit an oscillatory motion to the shaker housing 67 which, being flexibly supported, will quietly but vigorously oscillate.

The shaker housing 67 also contains beneath the screen 8 a chute 9, which chute is inclined at a greater angle than the shaker screen 8. The lower end of the shaker chute 9 terminates at a point in feeding relation to the grinding rolls 15 and 16.

During the cracking of the coffee by the cracking rolls 6 and 7, chaff is liberated from the beans and some of the beans are cracked to a finer state of division than others. The cracked coffee discharged from the cracking rolls 6 and 7 will therefore fall upon the upper end of the shaker screen 8 and the more finely divided particles of coffee will pass through the shaker screen onto the chute 9, from whence such finer particles are discharged directly into the grinding rolls 15 and 16. At the lower end of the shaker screen 8, only the chaff, large particles of coffee, and impurities such as strings or other larger pieces, remain. At this point suction is applied as by means of a boot or conduit 11. Preferably the boot or conduit 11 is adjustable so as to assume various positions between the extremes indicated by the dotted lines in Fig. 4. By so adjusting the position of the boot, it is possible to regulate the effect of the suction upon the material falling off the lower end of the shaker screen without the necessity of modifying the size or speed of the suction fan 12 connected to said conduit 11. Furthermore, by adjusting the position of the boot 11 with respect to the end of the shaker screen 8, the amount of chaff being removed may be regulated and controlled.

Positioned between the lower end of the shaker screen 8 and the chute 9 and extending beyond the edge of the housing 78 enclosing the grinding rolls 15 and 16, is the string catcher 10. The string catcher is mounted in a frame in an inclined position and may consist of small round bars capable of permitting larger particles of coffee to pass therethrough but adapted to catch and retain larger particles such as strings and other foreign materials. This string catcher may either be mounted as an extension of the shaker housing 67 or it may be stationary. The strings and other foreign materials retained by the string catcher are permitted to drop exteriorly of the housing 78. The larger particles of coffee thus separated from the foreign materials drop into the grinding rolls 15 and 16.

In adjusting the apparatus described hereinabove, it has been found that cracking rolls 6 inches in diameter and 36 inches long give the best results. These cracking rolls are set up to about within 0.012 inch. The grinding rolls, on the other hand, are at least 8 inches in diameter and are set up to about within 0.008 inch of each other. The use of large diameter rolls for grinding increases the grip and permits the maintenance of a uniform grinding or cutting action. Furthermore, the coffee is more uniformly spread out over the rolls. The cracking rolls may be provided with 8 teeth per inch whereas the finishing or grinding rolls may be provided with 20 teeth per inch.

Mention has been made hereinabove of the strength of the spring 32 used in the bearing block guides. It has been found that instead of employing short and relatively weak springs, greatly improved results are obtained when very strong springs are used. The springs used in the guiding frames in which the grinding rolls are journaled have a 6,000 pound deflection per inch, in an experimental unit made in accordance with this invention. The use of such a strong spring is important because it keeps the rolls in place and does not permit them to vibrate, thereby insuring uniformity in operation.

Attention should also be called to the fact that the shaker screen 8 is relatively short. When 6 inch cracking rolls and 8 inch grinding rolls were used, the shaker screen 8 was only 24 inches long. The use of a short screen of this sort is important in that it prevents the coffee from becoming aerated and losing flavoring characteristics.

After the coffee passes through the grinding or finishing rolls 15 and 16, it is discharged through the conduit 80 into the mixing unit 17. As pointed out hereinabove, the mixing unit blends the ground coffee with the separately ground chaff at a low speed so that the coffee is not subjected to attrition or rubbing. Coffee thus mixed is then discharged into hoppers 5 which supply the can filling or packaging machines.

I claim:

1. A method of manufacturing coffee characterized by enhanced flavor extracting properties, which comprises cracking the roasted coffee, separating the fines from the coarser coffee and chaff, separating the chaff from the coarser coffee in the substantial absence of fines, grinding the fines and coarser coffee in the substantial absence of chaff, separately grinding the chaff, and finally mixing the ground coffee and separately ground chaff together to form a finished coffee.

2. In a method of preparing coffee having enhanced flavor extraction properties, which comprises cracking the coffee, separating the fines from the coarser coffee and chaff, separating the chaff from the coarser coffee in the substantial absence of fines, and then subjecting the fines and coarse coffee to a single grinding operation in the absence of chaff.

3. In a method of manufacturing coffee having enhanced flavor extraction properties, the step of grinding the coffee in the substantial absence of chaff, separately grinding the chaff, and then mixing the ground coffee and chaff to form a finished coffee containing substantially no particles adapted to remain on a No. 5½ sieve and over 70% passing a No. 4½ sieve but retained on a No. 28 sieve.

LELAND S. MAEDE.